(12) United States Patent
Bhattacharya et al.

(10) Patent No.: US 10,036,670 B2
(45) Date of Patent: Jul. 31, 2018

(54) SYSTEMS AND METHODS FOR PEAK JUNCTION TEMPERATURE SENSING AND THERMAL SAFE OPERATING AREA PROTECTION

(71) Applicant: CIRRUS LOGIC, INC., Austin, TX (US)

(72) Inventors: Anindya Bhattacharya, Tucson, AZ (US); Tim Green, Tucson, AZ (US); Jing Bai, Tempe, AZ (US)

(73) Assignee: CIRRUS LOGIC, INC., Austin, TX (US)

( * ) Notice: Subject to any disclaimer, the term of this patent is extended or adjusted under 35 U.S.C. 154(b) by 87 days.

(21) Appl. No.: 15/162,325

(22) Filed: May 23, 2016

(65) Prior Publication Data

US 2016/0320246 A1 Nov. 3, 2016

Related U.S. Application Data

(62) Division of application No. 13/563,484, filed on Jul. 31, 2012, now Pat. No. 9,347,835.

(60) Provisional application No. 61/524,666, filed on Aug. 17, 2011.

(51) Int. Cl.
*G01K 3/00* (2006.01)
*G01K 3/10* (2006.01)
*G01K 7/42* (2006.01)
*G01K 3/02* (2006.01)

(52) U.S. Cl.
CPC .............. *G01K 3/10* (2013.01); *G01K 3/02* (2013.01); *G01K 7/427* (2013.01)

(58) Field of Classification Search
None
See application file for complete search history.

(56) References Cited

U.S. PATENT DOCUMENTS

| | | | |
|---|---|---|---|
| 7,521,936 | B2 | 4/2009 | Stanley .......................... 307/149 |
| 8,260,473 | B1 * | 9/2012 | O'Brien .................. H01L 23/34 |
| | | | 700/299 |
| 2002/0125945 | A1 | 9/2002 | Taylor .......................... 330/129 |
| 2004/0060026 | A1 * | 3/2004 | Stanley ..................... H03F 1/52 |
| | | | 327/334 |
| 2004/0174218 | A1 * | 9/2004 | Dupuis ................. H03F 1/0211 |
| | | | 330/285 |
| 2004/0178852 | A1 | 9/2004 | Neunaber ...................... 330/284 |
| 2005/0231287 | A1 | 10/2005 | Wong et al. ................... 330/298 |
| 2008/0180177 | A1 | 7/2008 | Baldwin et al. .............. 330/298 |

(Continued)

OTHER PUBLICATIONS

Berkhout, M., "Integrated overcurrent protection system for class-D audio power amplifiers," in Solid-State Circuits, IEEE Journal of, vol. 40, Issue: 11 pp. 2237-2245 (9 pgs).

(Continued)

*Primary Examiner* — Lisa Caputo
*Assistant Examiner* — Nasir U Ahmed
(74) *Attorney, Agent, or Firm* — Hayes Soloway PC

(57) ABSTRACT

A peak junction temperature monitoring system for a semiconductor device includes a peak power dissipation sensor for sensing the peak power dissipation in the device. A temperature sensor senses an average temperature of the device, and a peak junction temperature computation circuit generates a signal representative of a peak junction temperature based on input from the peak power dissipation sensor and the temperature sensor.

11 Claims, 10 Drawing Sheets

(56) References Cited

U.S. PATENT DOCUMENTS

2009/0108681 A1    4/2009    Litovsky ................ 307/110
2009/0201067 A1    8/2009    Haneda ................ 327/306

OTHER PUBLICATIONS

DeCelles, J., "SPiKe—Protection Safeguards Monolithic IC and Output Power Discretes," in AES Convention:97 (Nov. 1994) Paper No. 3933 (13 pgs).

Krabbenborg, B., "Protection of audio amplifiers based on temperature measurements in power transistors," in Solid-State Circuits Conference, 2004. Digest of Technical Papers. ISSCC. 2004 IEEE International, pp. 374-375 vol. 1 (8 pgs).

Office Action issued in U.S. Appl. No. 13/563,484, dated May 7, 2015 (9 pgs).

Office Action issued in U.S. Appl. No. 13/563,484, dated Oct. 15, 2015 (7 pgs).

\* cited by examiner $I_{PD\_PK\_SENSE} = \frac{1}{M} \times (PD\_PK)$

PD_PK = Peak Power Dissipation in Lo - Side Driver

SYSTEMS AND METHODS FOR PEAK JUNCTION TEMPERATURE SENSING AND THERMAL SAFE OPERATING AREA PROTECTION

CROSS REFERENCE TO RELATED APPLICATION

This application is a divisional of U.S. patent application Ser. No. 13/563,484 filed Jul. 31, 2012, which in turn claims the benefit and priority from U.S. Patent Application Ser. No. 61/524,666, filed Aug. 17, 2011, the contents of which are incorporated herein in their entirety.

FIELD OF THE INVENTION

The present disclosure is generally related to systems and methods for peak junction temperature sensing and thermal safe operating area (SOA) protection. The invention has particular utility in connection with semiconductor devices, and particularly amplifier driver devices, and will be described in connection with such utility, although other utilities are contemplated.

BACKGROUND OF THE INVENTION

Amplifier output stages are frequently subjected to safe operating area (SOA) violations while driving loads in many applications. During an SOA violation, the peak junction temperature of the driver device exceeds the absolute maximum junction temperature of the driver device and can cause device destruction.

A conventional method to protect against SOA violations is to use a temperature sensor near the output driver device. The temperature sensor senses an average temperature in the vicinity of the output driver but is not able to sense and report the peak temperature excursions.

FIG. 1 is a plot showing the difference between the temperatures 10 sensed by such known temperature sensors in the vicinity of the output driver, and the actual temperature 11 of the driver device, when the output driver is subjected to large pulse power dissipation that causes an SOA violation. The actual temperature (11) of the driver device is measured using a thermal IR camera. As shown in FIG. 1, the temperature 10 sensed by the temperature sensor generally differs by at least 50-80° C. from the actual peak junction temperature (11), depending upon power dissipated, e.g., as measured by thermal IR camera. If the absolute maximum junction temperature is 150° C., which is a typical figure for many output driver devices, an SOA violation is not detected by the temperature sensor as shown in FIG. 1, even though the actual junction temperature exceeds 150° C.

Another method for protecting against SOA violations involves the use of an embedded temperature sensor. However, there are at least two major disadvantages to the embedded temperature sensor approach. First, such methods are generally specific to high power bipolar processors. For a DMOS (Double-Diffused-Metal-Oxide Semiconductor) process, the embedded temperature sensor is very difficult to implement and is prone to false trip and latch up issues caused by triggering of parasitic junctions. Secondly, depending upon layout, the embedded temperature sensor may also suffer from significant inaccuracies in measured temperature, as compared to the actual peak junction temperature. FIG. 2 shows a thermal simulation using finite element analysis (FEA) at 18 W peak power dissipation for an exemplary output driver device with an embedded temperature sensor in the center of the device. As shown in FIG. 2, the temperature 21 sensed by the embedded temperature sensor is 113.4° C., while the maximum actual peak junction temperature 22 is 129.4° C. Thus, the temperature 21 sensed by the embedded temperature sensor is at least 16° C. lower than the actual peak junction temperature 22.

Overcurrent protection is another known technique in amplifiers for protecting the output devices against SOA violations. However, overcurrent protection or current limiting is generally not adequate to protect against SOA violations. In many applications using reactive loads, load current and output voltage can have an out-of-phase relationship or phase delay between them. Thus, an SOA violation can occur at much lower output current levels that are well below the overcurrent trip threshold if there is a higher voltage across the output driver device.

Thus, a need exists in the industry to address the aforementioned deficiencies and inadequacies.

SUMMARY OF THE INVENTION

Systems and methods for peak junction temperature sensing and thermal SOA protection for a semiconductor device are disclosed. Briefly described, in architecture, one embodiment of the system, among others, can be implemented as follows. The system contains a peak power dissipation sensor configured to sense the peak power dissipation in the device and outputs a signal representative of the sensed peak power dissipation. A temperature sensor is configured to sense an average temperature of the device and outputs a signal representative of the average temperature. A peak junction temperature computation circuit is configured to receive the signals from the peak power dissipation sensor and the temperature sensor, and generate a signal representative of a peak junction temperature based on the received signals.

In a further embodiment, systems for detecting thermal safe operating area violations for a semiconductor device are disclosed. The system includes a peak power dissipation sensor configured to sense the peak power dissipation in the device and output a signal representative of the peak power dissipation. A temperature sensor is configured to sense an average temperature of the device and output a signal representative of the average temperature. A maximum allowable peak power dissipation determining circuit is configured to determine a maximum allowable peak power dissipation based at least in part on the signal representative of the average temperature, and to output a signal representative of the maximum allowable peak power dissipation. A comparator is configured to compare the signal representative of the peak power dissipation with the signal representative of the maximum allowable peak power dissipation, and to output a signal indicative of a thermal safe operating area violation if the peak power dissipation exceeds the maximum allowable peak power dissipation.

Methods for monitoring a peak junction temperature in a semiconductor are also disclosed. In this regard, one embodiment of such a method, among others, can be broadly summarized by the following steps: sensing a peak power dissipation in the device; sensing an average temperature of the device; and generating a signal representative of a peak junction temperature based on the sensed peak power dissipation and average temperature.

Methods of detecting a thermal safe operating area violation in a semiconductor device are further described. In this regard, one embodiment of such a method, among others, can be broadly summarized by the following steps: sensing a peak power dissipation in the device; comparing the sensed peak power dissipation with a signal representative of a maximum allowable peak power dissipation; and generating a signal indicative of a thermal safe operating area violation if the peak power dissipation exceeds the maximum allowable peak power dissipation.

In yet another aspect, a semiconductor chip that includes a semiconductor device having a peak power dissipation sensor configured to sense the peak power dissipation in the device and output a signal representative of the peak power dissipation is disclosed. A temperature sensor is configured to sense an average temperature of the device and output a signal representative of the average temperature. A peak junction temperature computation circuit is configured to receive signals from the peak power dissipation sensor and the temperature sensor, and to generate a signal representative of a peak junction temperature based on the received signals.

In a further embodiment, a semiconductor chip that includes a semiconductor device having a peak power dissipation sensor configured to sense the peak power dissipation in the device and output a signal representative of the peak power dissipation is disclosed. A temperature sensor is configured to sense an average temperature of the device and output a signal representative of the average temperature. A maximum allowable peak power dissipation determining circuit is configured to determine a maximum allowable peak power dissipation based at least in part on the signal representative of the average temperature, and to output a signal representative of the maximum allowable peak power dissipation. A comparator is configured to compare the signal representative of the peak power dissipation with the signal representative of the maximum allowable peak power dissipation, and to output a signal indicative of a thermal safe operating area violation if the peak power dissipation exceeds the maximum allowable peak power dissipation.

Other systems, methods, features, and advantages are or will become apparent to one with skill in the art upon examination of the following drawings and detailed description. It is intended that all such additional systems, methods, features, and advantages be included within this description, be within the scope of the present invention, and be protected by the accompanying claims.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
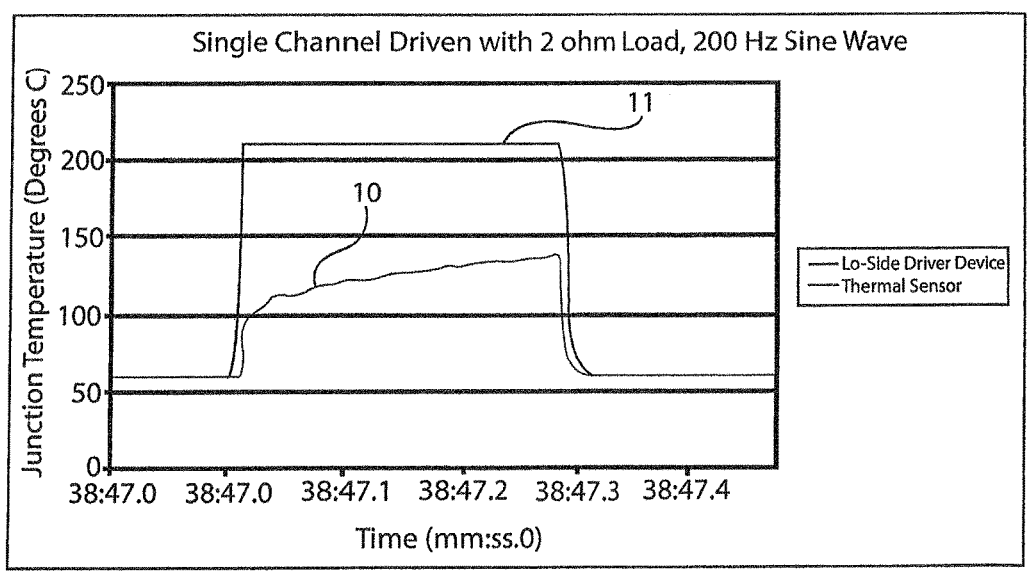
FIG. 1 is a plot illustrating the difference between the temperatures sensed by prior art temperature sensing techniques and the actual temperature of the driver device.
Figure 2:
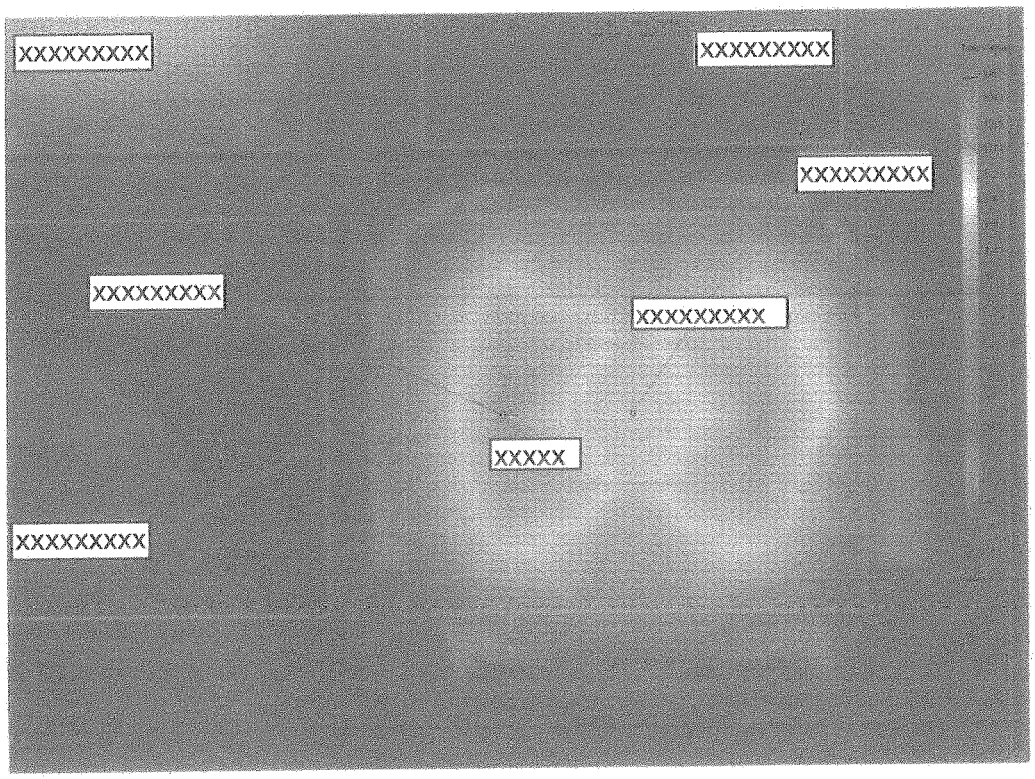
FIG. 2 illustrates a thermal simulation for an output driver device with an embedded temperature sensor in the center of the device, as known in the prior art.
Figure 3:
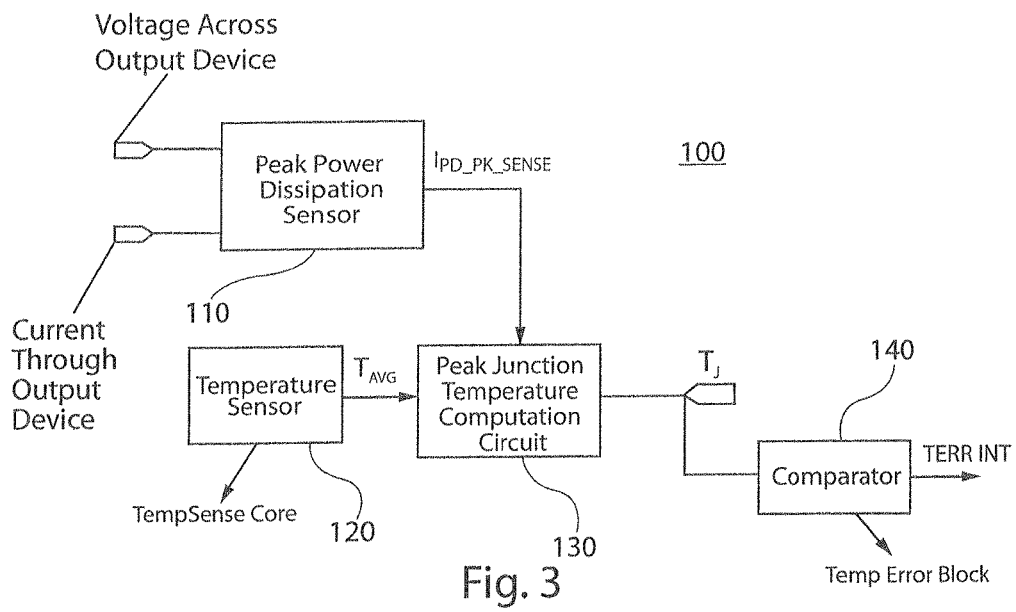
FIG. 3 is an illustration of a first exemplary block diagram of a peak junction temperature monitoring system for a semiconductor device.

FIG. 3 is an illustration of a first exemplary block diagram of a peak junction temperature monitoring system 100 for a semiconductor device. The system 100 contains a peak power dissipation sensor 110, a temperature sensor 120 and a peak junction temperature computation circuit 130.

The peak power dissipation sensor 110 receives signals representative of voltage across the output driver device and current through the output driver device, and senses the peak power dissipation in the output driver device in real time when the amplifier is operational. The output of the peak power dissipation sensor 110 is a signal (e.g., current signal $I_{PD\_PK\_SENSE}$) that represents the peak power dissipated in the output driver device. This signal is input into the peak junction temperature computation circuit 130, which computes the peak junction temperature based on the signal representative of the peak power dissipation and the signal representative of the average temperature, received from the temperature sensor 120.

The temperature sensor 120 is located in the vicinity of the output driver device, but is not embedded into the output driver device. There is no specific, required location for the temperature sensor 120 (i.e., no specific distance from the driver device on a chip) in order to measure an "average temperature," as disclosed herein. Rather, the temperature sensor 120 may be located anywhere such that it can sense a temperature of the device. For example, the temperature sensor 120 may be located on a chip somewhere in the general vicinity of the device. As will be further described herein, in particular with respect to FIGS. 6 and 7a-c, the peak power dissipated (PD_PK) in the driver device may be linearly correlated with the temperature difference ($\Delta T$) between the peak junction temperature ($T_J$) and the measured average temperature ($T_{AVG}$). The peak junction temperature ($T_J$) may be calculated, using the linear correlation, based on sensed peak power dissipation and the sensed averaged temperature. Thus, it is not critical that the temperature sensor 120 be located in any specific position or distance from the output driver device, as the peak power dissipation (PD_PK) and the temperature difference ($\Delta T=T_J-T_{AVG}$) may still be correlated and used to compute the peak junction temperature ($T_J$) based on the sensed peak power dissipation (PD_PK) and average temperature ($T_{AVG}$).

The temperature sensor 120 may be any type of sensor for sensing a temperature of a driver device. The temperature sensor 120 senses an average temperature of the device, and outputs a signal representative of the sensed average temperature to the peak junction temperature computation circuit 130. The peak computed junction temperature ($T_J$) is computed by the peak junction temperature computation circuit 130, based on the signal received from the temperature sensor 120 and the signal received from the peak power dissipation sensor 110. The peak junction temperature computation circuit 130 is further described below, particularly with respect to FIG. 8.

The peak junction temperature computation circuit 130 may generate a signal representative of the computed peak junction temperature, which may be input into a comparator 140, which compares the computed peak junction temperature ($T_J$) with a maximum allowable peak junction temperature, and may generate a signal indicating an SOA condition if the computed peak junction temperature ($T_J$) exceeds the maximum allowable temperature.

Figure 4:
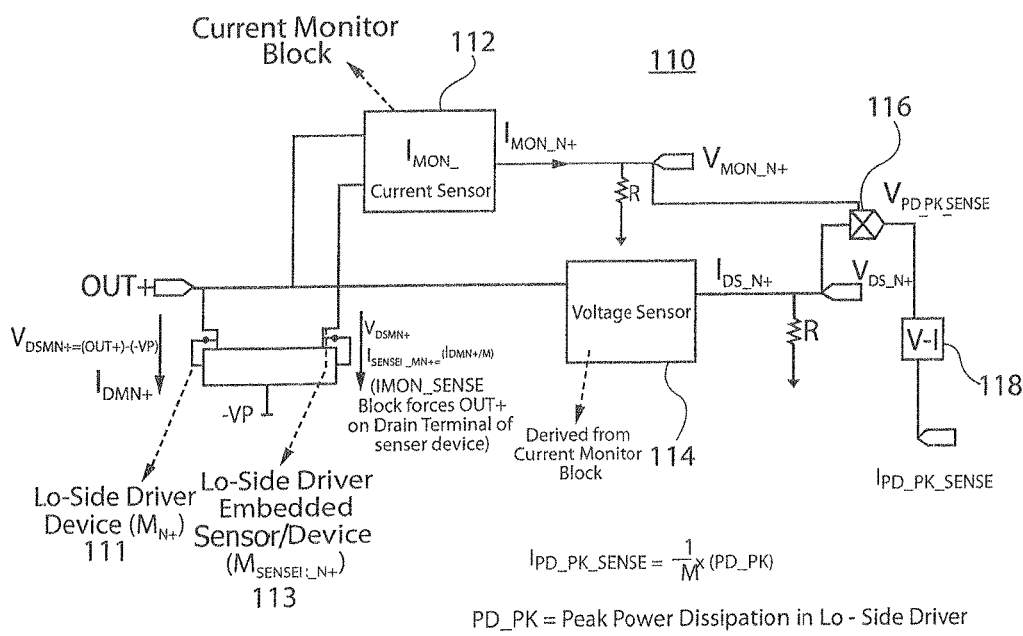
FIG. 4 is an illustration of a block diagram of the peak power dissipation sensor of the system shown in FIG. 3.

FIG. 4 is an illustration of a block diagram of the peak power dissipation sensor 110 of the system 100 shown in FIG. 3. The peak power dissipation sensor 110 includes a current sensor 112 and a voltage sensor 114.

The current through the output device 111 is sensed by the sense device 113 and input into the current sensor 112. The output (e.g., $I_{MON\_N+}$) of the current sensor 112 is a signal representative of the current through the output device 111 (e.g., Io-side driver device $M_{N+}$) when the amplifier is operational. The voltage sensor 114 senses the voltage across the device 111 ($M_{N+}$).

The output (e.g., $I_{DS+\_N+}$) of the voltage sensor 114 is a signal representative of the voltage across the device 111 ($M_{N+}$). The signal representative of the current through the output device 111, output from the current sensor 112 ($I_{MON\_N+}$), and the signal representative of the voltage across the device 111, output from the voltage sensor 114 ($I_{DS\_N+}$), are multiplied by a multiplication element 116. The resulting signal, output from the multiplication element 116, is a signal ($I_{PD\_PK\_SENSE}$) which is representative of real-time peak power dissipation in the device 111 ($M_{N+}$). This signal may be a voltage signal (e.g., $V_{PD\_PK\_SENSE}$), which may be converted into a current signal (e.g., $I_{PD\_PK\_SENSE}$) through a voltage-to-current converter 118. The multiplication element 116 may be any known circuit element for multiplying signals, including for example, an electronic mixer for producing an output signal equal to the product of the two input signals.

Figure 5A:
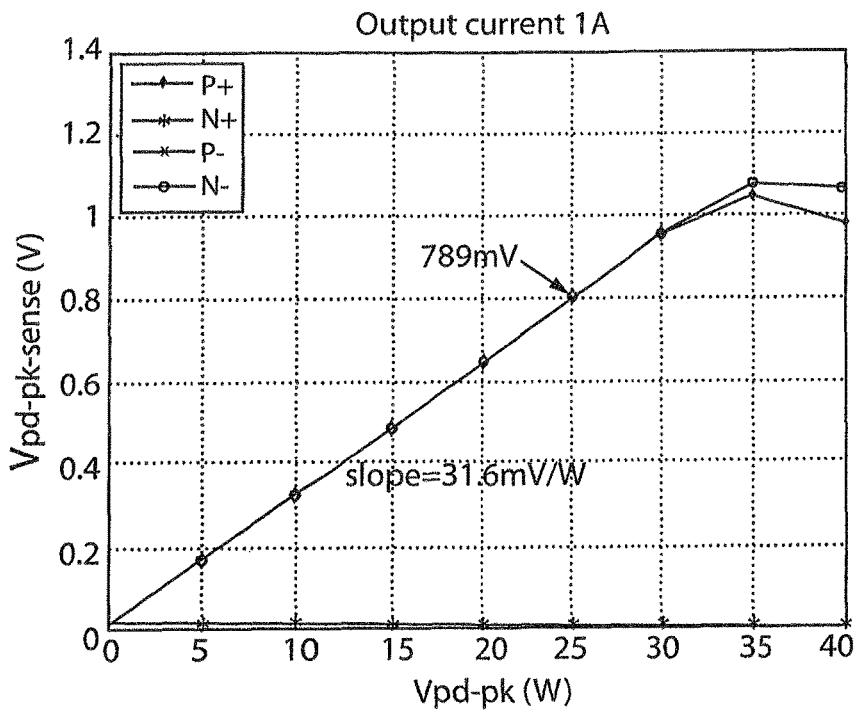
FIGS. 5a and 5b are plots illustrating the linearity of the peak power dissipation sense signal in relation to the actual peak power dissipation through the device, in accordance with the system shown in FIG. 3.
Figure 5B:
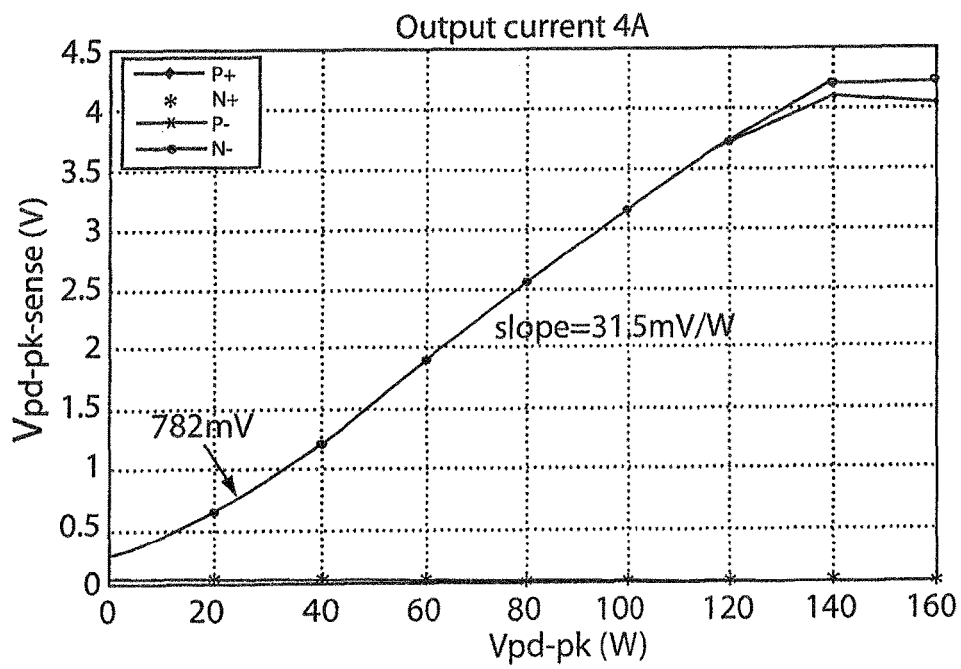

FIGS. 5a and 5b are plots demonstrating the linearity of the peak power dissipation sense signal (shown in volts on the y-axis), i.e. the signal representative of the peak power dissipation through a device (e.g., device 111 in FIG. 4), in relation to the actual peak power dissipation through the device (shown in watts on the x-axis). The actual peak dissipated power through the device may be measured using any known power dissipation measurement techniques, for example, by using test instruments to directly measure current and voltage through the device. The sense signal representative of the peak power dissipation through the device may be, for example, a voltage signal (e.g., signal $V_{PD\_PK\_SENSE}$ in FIG. 4) or a current signal (e.g., $I_{PD\_PK\_SENSE}$ in FIG. 4).

In the example shown in FIG. 5a, the sense signal is a voltage signal and the output current is fixed at 1 A. As the peak dissipated power increases (x-axis), for example, by increasing the drain-to-source voltage across the device, while keeping the output current fixed at 1 Amp, the sensed voltage (y-axis) increases linearly. That is, the sense signal is linearly proportional to the actual, measured peak power dissipated through the device, and the relationship between the sense signal and the actual peak power dissipation may be expressed as:

Sense Signal=1/$M$*Peak Power Dissipation, where M is a scaling factor or M-factor, for example in W/mV, which may be the reciprocal of the slope of the line relating the sense signal to the measured peak power dissipation.

As shown in the example of FIG. 5a, the slope equals 31.6 mV/W, and M is 1/31.6 W/mV. Thus, a sense signal of 10 mV would represent a peak power dissipation of 0.316 Watts. The M-factor may be set to a desired value, for example, by selecting a sense device 113 that passes a very small amount of current, as compared to the current through the output device 111. For example, the sense device 113 may be a sense MOSFET that passes a very small amount of current proportional to the current in the MOSFET output device 111. As shown in FIG. 4, the drain, source and gate voltage may be the same on both the output device 111 and the sense device 113. Additionally, or alternatively, the M-factor may be adjusted to any desired value utilizing current sense resistors or other current sense techniques known in the relevant field.

FIG. 5b, like FIG. 5a, is a plot demonstrating the linearity of the peak power dissipation sense signal in relation to the actual peak power dissipation through the device. In FIG. 5b, the output current is set at 4 Amps. The slope equals 31.5 mV/W, and M is 1/31.5 W/mV. Thus, even with an output current set at four times higher than in the plot of FIG. 5a, the slope of the line remains essentially the same. That is, the sense signal remains linearly proportional to the actual peak power dissipated through the device at a higher output current, with the same slope, and for a wide range of power dissipation. While there is some range of non-linearity in both FIGS. 5a and 5b (particularly at very high peak power dissipation), these ranges are not of interest as they likely are outside of the operating range of the output device 111, and thus likely will not be experienced in the output device 111.

Figure 6:
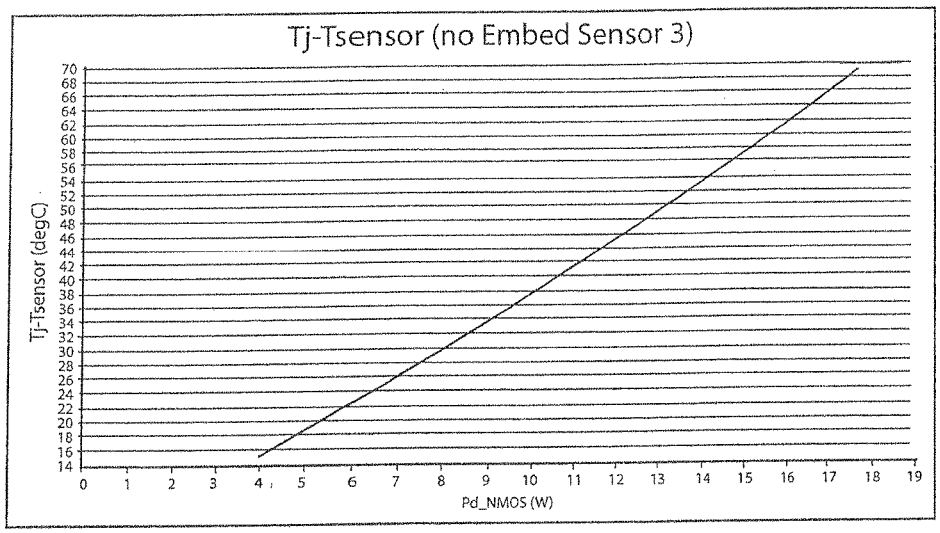
FIG. 6 is a plot illustrating the substantially linear correlation between $\Delta T$ ($\Delta T = T_J - T_{AVG}$) and peak power dissipation through the device (PD_PK) with changing pulse power widths as well as repetitive pulse power, in accordance with the system shown in FIG. 3.

FEA simulation and thermal camera data show that the relationship between $\Delta T$ ($\Delta T=T_J-T_{AVG}$) and peak power dissipation through the device 111 (PD_PK) is substantially linear with changing pulse power widths as well as repetitive pulse power, as can be seen from FIG. 6. The data shown in the plot of $\Delta T$ versus peak power dissipation in FIG. 6 were collected and analyzed for pulse widths ranging from 1 ms to 10 ms and pulse power ranges from 5 W to 20 W (see FIGS. 7a-c). This range was determined based upon the range of temperatures that produce SOA violations for audio output devices; however, any other range may be of interest, depending upon the application, and the relationship between $\Delta T$ and peak power dissipation through a device may accordingly be derived and utilized for any such desired range of SOA violations. The peak power dissipation (PD_PK) was measured using instruments (e.g., voltage and current probes) to measure the peak power dissipation through the output device in real-time. The peak junction temperature ($T_J$) was measured using a thermal camera, and the average temperature ($T_{AVG}$) was sensed using a temperature sensor 120 located in the vicinity of the output device 111.

Figure 7A:
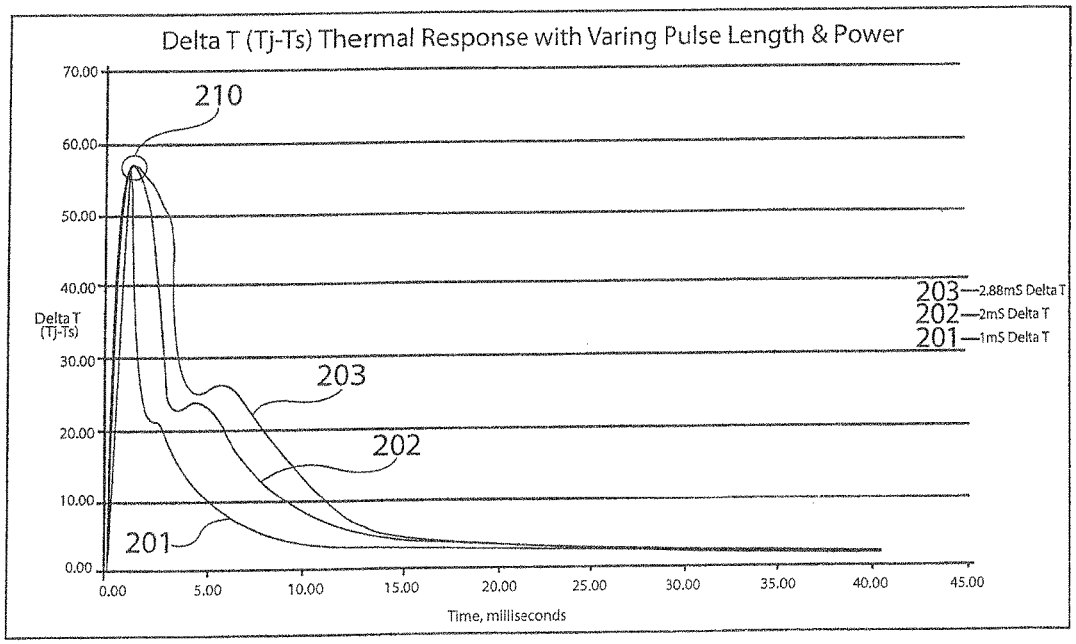
FIGS. 7a-c are plots illustrating the temperature difference ($\Delta T$) between the peak junction temperature ($T_J$) and the sensed average temperature ($T_{AVG}$) with differing applied pulse widths and pulse power, in accordance with the system shown in FIG. 3.
Figure 7B:
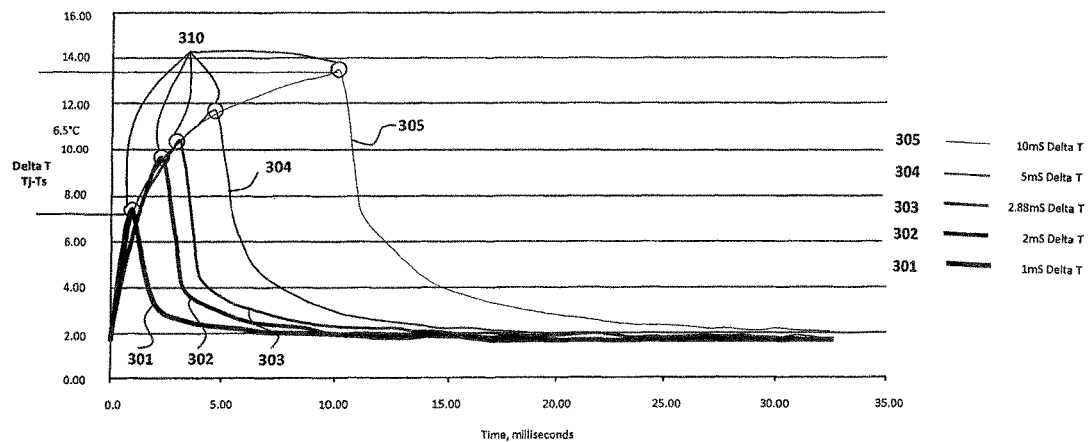
Figure 7C:
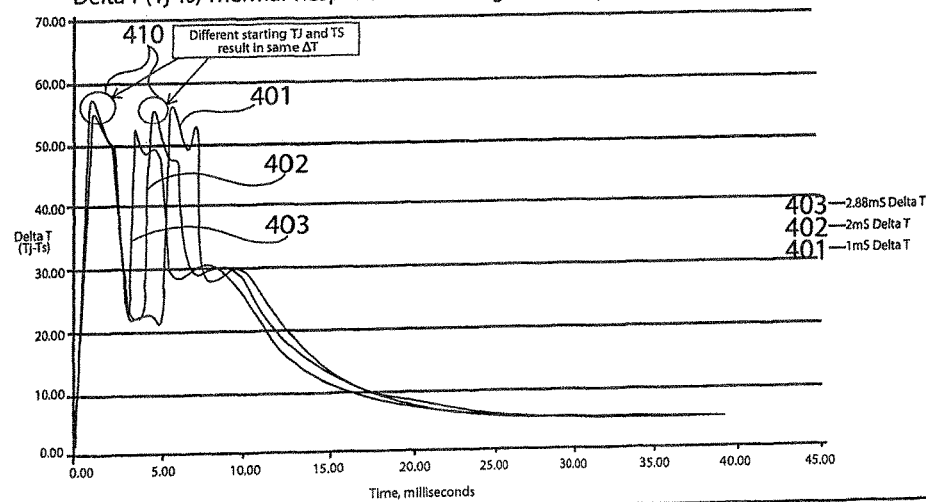

FIGS. 7*a-c* are plots showing the temperature difference ($\Delta T$) between the peak junction temperature ($T_J$) and the sensed average temperature ($T_{AVG}$) with differing applied pulse widths and pulse power. FIG. 7*a* is a plot of $\Delta T$ ($\Delta T = T_J - T_{AVG}$) versus time (ms) for an applied 18 W peak pulsed power with pulse widths: of 1 ms (line 201), 2 ms (line 202) and 2.88 ms (line 203). $\Delta T$ for each applied 18 W peak pulse has substantially the same maximum value 210. Thus, there is substantially no inaccuracy in the measurement of $\Delta T$, regardless of the pulse width, for an applied 18 W peak power pulse.

FIG. 7*b* is a plot of $\Delta T$ ($\Delta T = T_J - T_{AVG}$) versus time (ms) for an applied 5 W peak pulsed power with pulse widths: of 1 ms (line 301), 2 ms (line 302), 2.88 ms (line 303) 5 ms (line 304) and 10 ms (line 305). $\Delta T$ for each applied 5 W peak pulse has a slightly different maximum value 310. Thus, there is some, but not substantial, inaccuracy in the measurement of $\Delta T$, depending on the pulse width of the applied 5 W peak power pulse. The worst case inaccuracy of $\Delta T$, as seen in FIG. 7*b*, is about 6.5° C. That is, with an applied 5 W pulse having a pulse width of 1 ms, the maximum difference ($\Delta T$) between the peak junction temperature ($T_J$) (e.g., as measured by a thermal camera) and the sensed average temperature ($T_{AVG}$) (e.g., as sensed using a temperature sensor 120 located in the vicinity of the output device 111) is about 6.5° C. less than the maximum difference ($\Delta T$) between the peak junction temperature ($T_J$) and the sensed average temperature ($T_{AVG}$) for an applied 5 W pulse having a pulse width of 10 ms.

FIG. 7*c* is a plot of $\Delta T$ ($\Delta T = T_J - T_{AVG}$) versus time (ms) for an applied 18 W repetitive peak pulsed power with pulse widths: of 1 ms (line 401), 2 ms (line 402) and 2.88 ms (line 403). $\Delta T$ for each applied 18 W peak pulse has multiple maxima, with the maxima for each pulse width having substantially the same maximum value. For example, for the applied 18 W repetitive peak pulse having a 2 ms pulse width (line 402), $\Delta T$ has two maximums 410, both having the same value.

By measuring the peak dissipated power and the corresponding $\Delta T$ (e.g., as shown in FIG. 6), and/or by measuring $\Delta T$ in response to a known, applied peak pulse power (e.g., as shown in FIGS. 7*a-c*), a relationship between $\Delta T$ and peak power dissipation may be derived, and $\Delta T$ can be approximated to be linear with changing peak power dissipation.

Figure 8:
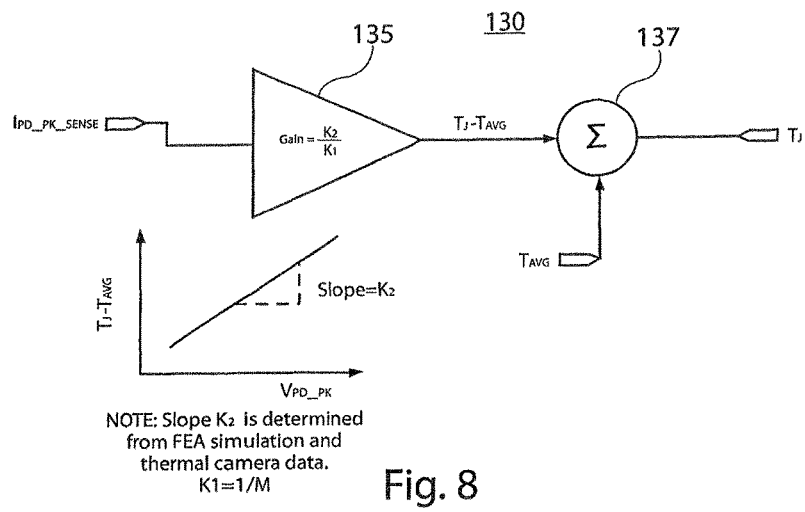
FIG. 8 is an illustration of a block diagram of the peak junction temperature computation circuit of the system shown in FIG. 3.

FIG. 8 is an illustration of a block diagram of the peak junction temperature computation circuit 130. The peak power dissipation sense signal ($I_{PD\_PK\_SENSE}$) is used to calculate $\Delta T$ ($\Delta T = T_J - T_{AVG}$). As discussed above, the linear relationship between peak power dissipation and $\Delta T$ may be derived and known. The peak power dissipation sense signal is input into an amplifier or gain block 135, which applies a gain to the signal of $K_2/K_1$, where $K_2$ is the slope of the line correlating $\Delta T = T_J - T_{AVG}$ with peak power dissipation (e.g., as shown in FIG. 6), and $K_1 = 1/M$, where M is a scaling or M-factor, for example as discussed above with respect to FIGS. 5*a* and 5*b*. The output of the gain block ($\Delta T = T_J - T_{AVG}$) is summed by summation element 137 with $T_{AVG}$, sensed by the temperature sensor 120, which results in a signal representative of $T_J$, the peak junction temperature.

Figure 9:
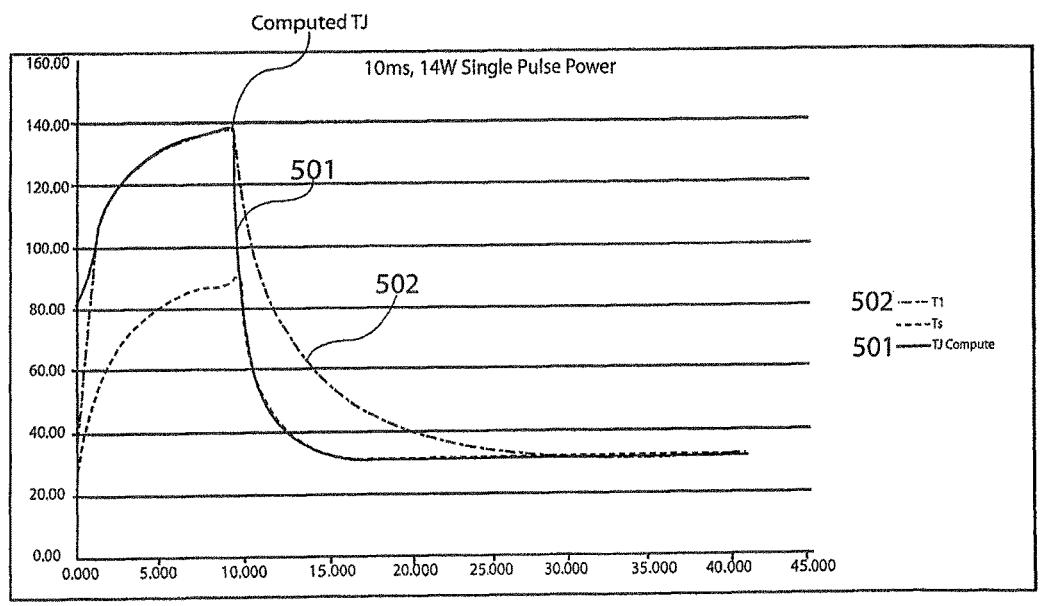
FIG. 9 is a plot illustrating the computed value of peak junction temperature ($T_J$) superimposed over the actual peak junction temperature, in accordance with the system shown in FIG. 3.

Utilizing the peak junction temperature computation circuit 130 shown in FIG. 8, FIG. 9 is a plot 900 showing the computed value of peak junction temperature ($T_J$) 501 superimposed over the actual peak junction temperature 502, as measured by a thermal camera, resulting from the application of a 14 W pulse having a pulse width of 10 ms. The units of the y-axis of the plot are degrees Celsius (° C.) and the units of the x-axis of the plot are milliseconds (ms). As seen in FIG. 9, the computed peak junction temperature 501 is almost identical to the actual, measured peak junction temperature 502 for substantially the entire duration of the application of the 10 ms, 14 W pulse (i.e., from 0 to 10.00 ms on the x-axis). The computed peak junction temperature 501 differs somewhat from the measured peak junction temperature 502 at lower temperature regions 505 (e.g., below about 80° C.); however, at such regions the possibility of SOA violation is very unlikely, and such low-temperature differences between computed peak junction temperature 501 and measured, actual peak junction temperature 502 are of little or no concern.

Figure 10:
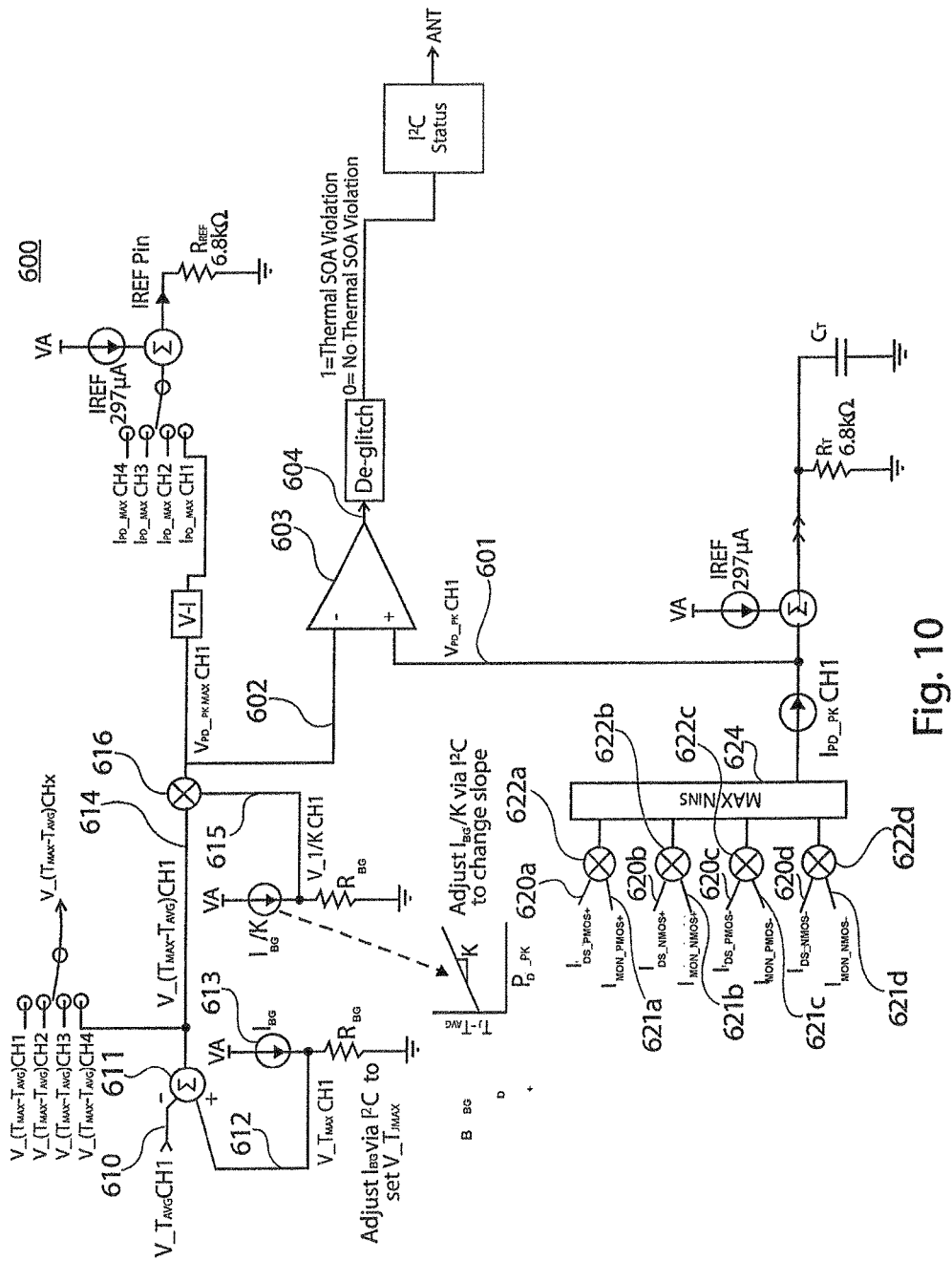
FIG. 10 is an illustration of a second exemplary block diagram of a thermal SOA violation detection system.

FIG. 10 is an illustration of a second exemplary block diagram of a thermal SOA violation detection system 600. The system 600 may be implemented on a chip. Unlike the system 100 of FIG. 3, where peak junction temperature is computed, the system 600 of FIG. 10 does not directly compute a peak junction temperature (e.g., by summing $\Delta T$ with $T_{AVG}$). Rather, the thermal SOA violation detect system 600 of FIG. 10 compares a signal 601 representative of peak power dissipation with a signal 602 representative of a maximum allowable peak power dissipation. The comparator 603 outputs a signal 604 which indicates whether the sensed peak power dissipation exceeds the maximum allowable peak power dissipation, and if so, generates a signal indicative of a SOA violation.

The signal representative of maximum allowable peak power dissipation ($I_{PD\_PK\_MAX}$) 602 is computed in real time using $T_{AVG}$, $T_{JMAX}$ and slope $K_2$. A signal 610 representative of the average temperature ($T_{AVG}$) is input from a temperature sensor 120 and is subtracted by a difference element 611 from a signal 612 representative of a maximum allowable peak junction temperature ($T_{JMAX}$). The signal 612 representative of a maximum allowable peak junction temperature ($T_{JMAX}$) may be selectively adjustable to represent any desired maximum peak junction temperature ($T_{JMAX}$), for example, by adjusting the current output from the current source 613.

The output of the difference element 611 is a signal 614 representative of $\Delta T$ ($=T_J - T_{AVG}$) which is multiplied by multiplication element 616 with a signal 615 representative of $1/K_2$, where $K_2$ is the slope of a line correlating $\Delta T$ with peak power dissipation. The output signal 602 of the multiplication element 616 is thus a signal representative of the maximum allowable peak power dissipation, and is input to the comparator 603.

For each device, for example, for each audio driver output device within a channel, sensed signals representative of current 620*a-d* and voltage 621*a-d* are input into a respective multiplication element 622*a-d*. The output from each multiplication element 622*a-d* is input into a maximum power dissipation determining circuit 624, which determines which of the input signals represents the largest peak power dissipation through a device, and outputs that signal 601. The signal representative of the peak power dissipation 601 is input to the comparator 603. The comparator 603 compares the signal representative of the peak power dissipation 601 with the signal representative of the maximum allowable peak power dissipation 602, and outputs a signal 604 indicative of whether a SOA violation has occurred. For example, the comparator 603 may output a logical "1" if the signal 601 exceeds the maximum allowable peak power signal 602, thereby indicating that a SOA violation has occurred. The comparator 603 may output a logical "0" if the signal 601 does not exceed the maximum allowable peak power signal 602, thereby indicating that no SOA violation has occurred.

Figure 11:
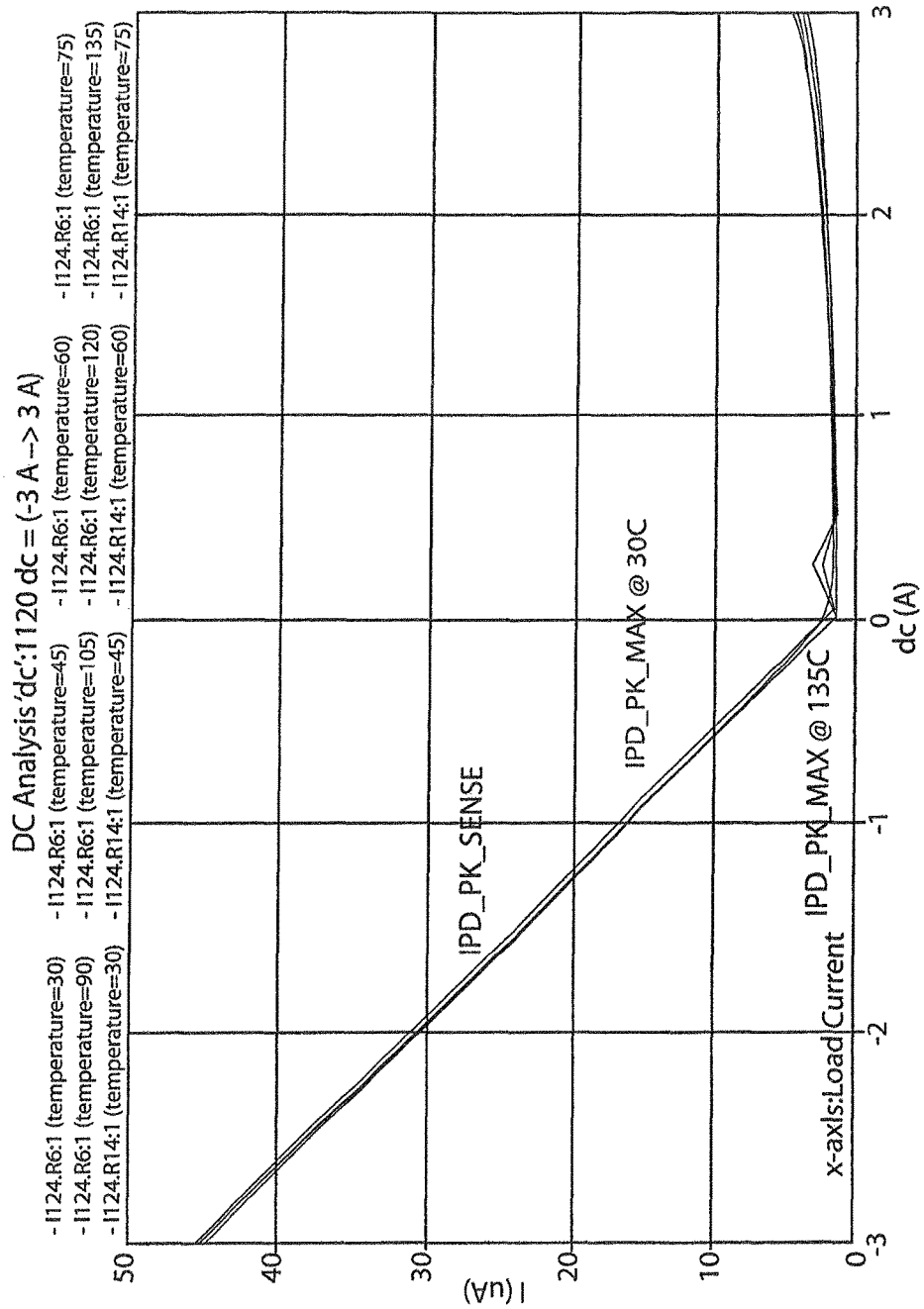
FIG. 11 is a plot illustrating simulation results for a circuit implementation of the system of FIG. 10.

Simulation results using actual circuit implementation are shown in FIG. 11. The simulation is run using $T_{AVG}$=25, 85 and 125° C., with the drain-to-source voltage of the output device ($V_{DS}$) held at a maximum voltage of 40V and the load current is swept from −3 A to +3 A. In all three cases (i.e., $T_{AVG}$=25, 85 and 125° C.), the maximum allowable peak junction temperature ($T_{JMAX}$) is programmed to be 150° C. The calculated signal representative of the maximum allowable peak power dissipation ($I_{PD\_PK\_MAX}$) 602 decreases with increasing temperature (and increasing sensed $T_{AVG}$) and correlates with measured thermal camera data.

Figure 12:
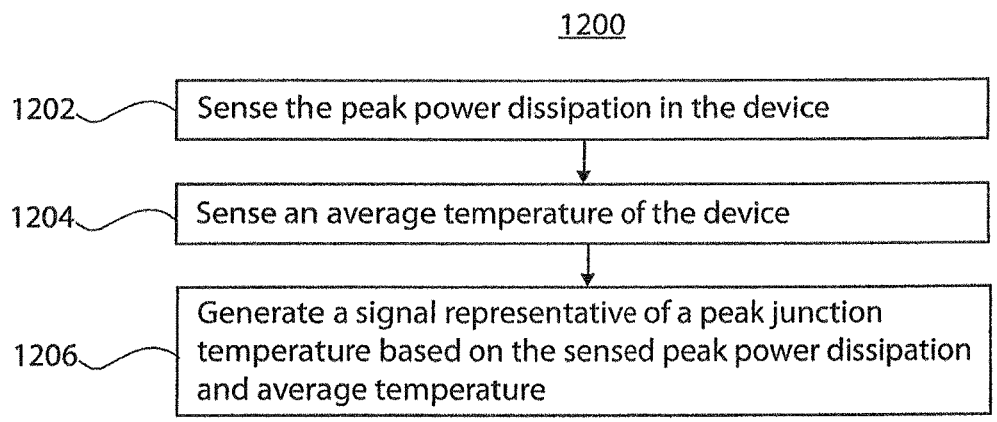
FIG. 12 is a flowchart illustrating a method of monitoring a peak junction temperature in a semiconductor device, in accordance with the system of FIG. 3.

FIG. 12 is a flowchart 1200 illustrating a method of monitoring a peak junction temperature in a semiconductor device, in accordance with the first exemplary system in FIG. 3. It should be noted that any process descriptions or blocks in flow charts should be understood as representing modules, segments, portions of code, or steps that include one or more instructions for implementing specific logical functions in the process, and alternate implementations are included within the scope of the present invention in which functions may be executed out of order from that shown or discussed, including substantially concurrently or in reverse order, depending on the functionality involved, as would be understood by those reasonably skilled in the art of the present invention.

As is shown by block 1202, the peak power dissipation in the device 111 is sensed. The peak power dissipation may be sensed by a peak power dissipation sensor 110, which may output a signal representative of the peak power dissipation in the device. An average temperature of the device 111 is sensed (block 1204) by a temperature sensor 120, which may be located in the vicinity of the device 111. The temperature sensor 120 may output a signal representative of the sensed average temperature. The temperature sensor 120 may be a non-embedded sensor. Based on the sensed peak power dissipation and average temperature, a signal representative of a peak junction temperature is generated (block 1206). The signal representative of a peak junction temperature may be generated by a peak junction temperature computation circuit 130 which receives the signal representative of the sensed peak power dissipation and the signal representative of said average temperature, and generates the signal representative of the peak junction temperature based on the received signals. The signal representative of the peak junction temperature may be compared with a signal representative of a maximum allowable junction temperature, and it may be determined whether the peak junction temperature exceeds the maximum allowable junction temperature.

Figure 13:
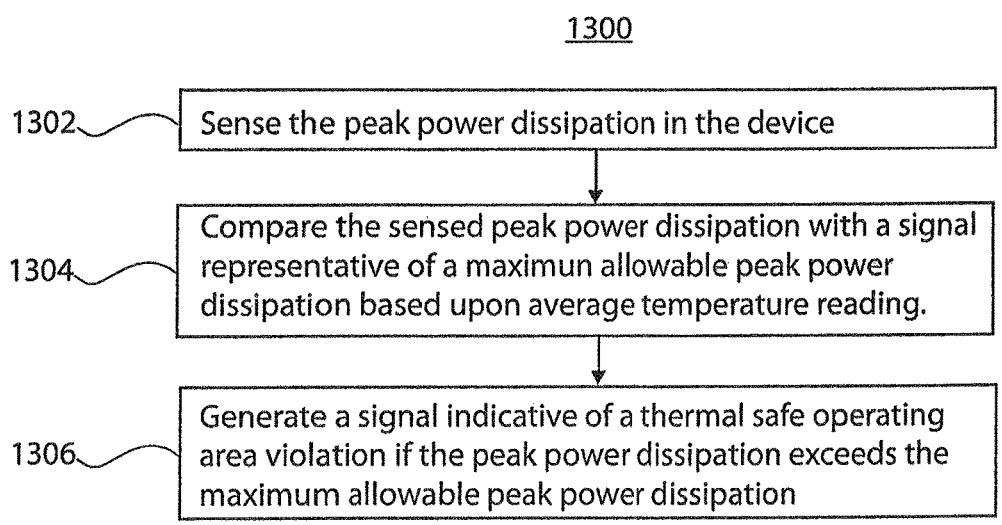
FIG. 13 is a flowchart illustrating a method of detecting a thermal safe operating area violation in a semiconductor device, in accordance with the system of FIG. 3.

FIG. 13 is a flowchart 1300 illustrating a method of detecting a thermal safe operating area violation in a semiconductor device, in accordance with the second exemplary system in FIG. 10. As is shown by block 1302, the peak power dissipation in the device is sensed. The sensed peak power dissipation 601 is compared with a signal representative of a maximum allowable peak power dissipation 602 (block 1304). The comparison may be performed by a comparator 503, which may generate a signal indicative of a thermal safe operating area violation if the peak power dissipation exceeds the maximum allowable peak power dissipation (block 1306).

The signal representative of a maximum allowable peak power dissipation 602 may be generated by computing a difference between a signal representative of a maximum allowable peak junction temperature 612 and the sensed average temperature 610, and multiplying the difference with a signal representative of the reciprocal of the slope of a line which correlates the difference between peak junction temperature and average temperature with peak power dissipation 615. The average temperature may be sensed by a non-embedded sensor. The signal representative of a maximum allowable peak junction temperature may be selectively adjustable.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiments of the invention without departing substantially from the spirit and principles of the invention. All such modifications and variations are intended to be included herein within the scope of this disclosure and the present invention and protected by the following claims.

What is claimed is:

1. A thermal safe operating area violation detection system for a semiconductor device, the system comprising:
   a peak power dissipation sensor configured to sense a peak power dissipation in a device and output a signal representative of said peak power dissipation;
   a temperature sensor configured to sense an average temperature of the device and output a signal representative of said average temperature;
   a maximum allowable peak power dissipation determining circuit configured to determine a maximum allowable peak power dissipation based at least in part on said signal representative of said average temperature, and to output a signal representative of the maximum allowable peak power dissipation, wherein said maximum allowable peak power dissipation determining circuit comprises:
      a difference element configured to receive a signal representative of a maximum allowable peak junction temperature, and said signal representative of said average temperature, and to output a signal representative of a difference between said received signals; and
      a multiplication element configured to multiply the difference signal with a signal representative of the reciprocal of the slope of a line which correlates the difference between peak junction temperature and average temperature with peak power dissipation; and
   a comparator configured to compare said signal representative of said peak power dissipation with said signal representative of the maximum allowable peak power dissipation, and to output a signal indicative of a thermal safe operating area violation if the peak power dissipation exceeds the maximum allowable peak power dissipation.

2. The system of claim 1, wherein the signal representative of a maximum allowable peak junction temperature is selectively adjustable.

3. The system of claim 1, wherein the maximum allowable peak power dissipation determining circuit determines the maximum allowable peak power dissipation in real-time.

4. The system of claim 1, further comprising:
a plurality of peak power dissipation sensors, each configured to sense the peak power dissipation in a respective device; and
a maximum power dissipation determining circuit, configured to receive from each of said plurality of peak power dissipation sensors a signal representative of said peak power dissipation, and to output to said comparator the signal representative of the largest sensed peak power dissipation.

5. The system of claim 1, wherein the temperature sensor is a non-embedded sensor.

6. The system of claim 1, wherein the device comprises a driver device for an audio amplifier.

7. A method of detecting a thermal safe operating area violation in a semiconductor device, the method comprising:
sensing a peak power dissipation in the device;
comparing the sensed peak power dissipation with a signal representative of a maximum allowable peak power dissipation, wherein said signal is generated by:
computing a difference between a signal representative of a maximum allowable peak junction temperature and the sensed average temperature; and
multiplying the difference with a signal representative of the reciprocal of the slope of a line which correlates the difference between peak junction temperature and average temperature with peak power dissipation; and
generating a signal indicative of a thermal safe operating area violation if the peak power dissipation exceeds the maximum allowable peak power dissipation.

8. The method of claim 7, further comprising:
sensing an average temperature of the device; and
generating the signal representative of a maximum allowable peak power dissipation based at least in part on a sensed average temperature.

9. The method of claim 7, wherein the signal representative of a maximum allowable peak junction temperature is selectively adjustable.

10. The method of claim 7, wherein the average temperature is sensed by a non-embedded sensor.

11. The method of claim 7, wherein the device comprises a driver device for an audio amplifier.

* * * * *